United States Patent
Gupta et al.

(10) Patent No.: US 11,323,437 B1
(45) Date of Patent: May 3, 2022

(54) MONITORING A MEDIA ACCESS CONTROL SECURITY SESSION

(71) Applicant: Juniper Networks, Inc., Sunnyvale, CA (US)

(72) Inventors: Nimit Gupta, Bangalore (IN); Alfa Prakash Puhan, Bangalore (IN); Manish Galrani, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 289 days.

(21) Appl. No.: 16/506,544

(22) Filed: Jul. 9, 2019

(51) Int. Cl.
| | |
|---|---|
| *H04L 29/06* | (2006.01) |
| *H04L 29/08* | (2006.01) |
| *G06F 21/60* | (2013.01) |
| *H04L 67/141* | (2022.01) |

(52) U.S. Cl.
CPC ........ *H04L 63/0876* (2013.01); *G06F 21/602* (2013.01); *H04L 63/061* (2013.01); *H04L 67/141* (2013.01)

(58) Field of Classification Search
None
See application file for complete search history.

(56) References Cited

U.S. PATENT DOCUMENTS

| | | | | |
|---|---|---|---|---|
| 7,853,691 | B2 * | 12/2010 | Elzur | H04L 69/08 709/225 |
| 10,637,865 | B2 * | 4/2020 | Hussain | H04L 63/06 |
| 10,686,595 | B2 * | 6/2020 | Chimakurthy | H04L 63/0869 |
| 10,979,428 | B2 * | 4/2021 | Du | H04L 63/126 |
| 2011/0019689 | A1 * | 1/2011 | Diab | H04L 49/3054 370/462 |
| 2013/0114601 | A1 * | 5/2013 | Branscomb | H04L 45/00 370/392 |
| 2015/0365409 | A1 * | 12/2015 | Mohamed | H04L 63/061 713/170 |
| 2016/0057121 | A1 * | 2/2016 | Metsala | H04L 63/08 713/175 |
| 2016/0373441 | A1 * | 12/2016 | Sirivara | H04L 9/0861 |
| 2017/0324566 | A1 * | 11/2017 | Kawasaki | H04L 63/0272 |
| 2018/0302269 | A1 * | 10/2018 | Sankaran | H04L 63/061 |
| 2019/0158279 | A1 * | 5/2019 | Chimakurthy | H04L 63/0876 |
| 2019/0173856 | A1 * | 6/2019 | Gareau | H04L 1/0061 |
| 2019/0190910 | A1 * | 6/2019 | Min | H04L 45/00 |
| 2019/0386824 | A1 * | 12/2019 | Havaralu Rama Chandra Adiga | H04L 9/0833 |
| 2020/0028711 | A1 * | 1/2020 | Janakiraman | H04L 12/44 |
| 2020/0220843 | A1 * | 7/2020 | Hill | H04L 45/026 |

OTHER PUBLICATIONS

CN 109104385. English Translation. (Year: 2018).*
Secure Bridging in Large Scale Deployment of Ethernet. Wahid. IEEE. (Year: 2010).*
Security Vulnerabilities, Attacks, Countermeasures, and Regulations of Networked Medical Devices—A Review. Yaqoob. IEEE. (Year: 2019).*

* cited by examiner

*Primary Examiner* — Nenkat Perungavoor
(74) *Attorney, Agent, or Firm* — Harrity & Harrity, LLP

(57) ABSTRACT

A device may determine that a first link of the device is active. The device may determine whether a Media Access Control Security (MACsec) session is established on the first link. The device may selectively enable or disable a second link of the device based on determining whether the MACsec session is established on the first link.

20 Claims, 12 Drawing Sheets

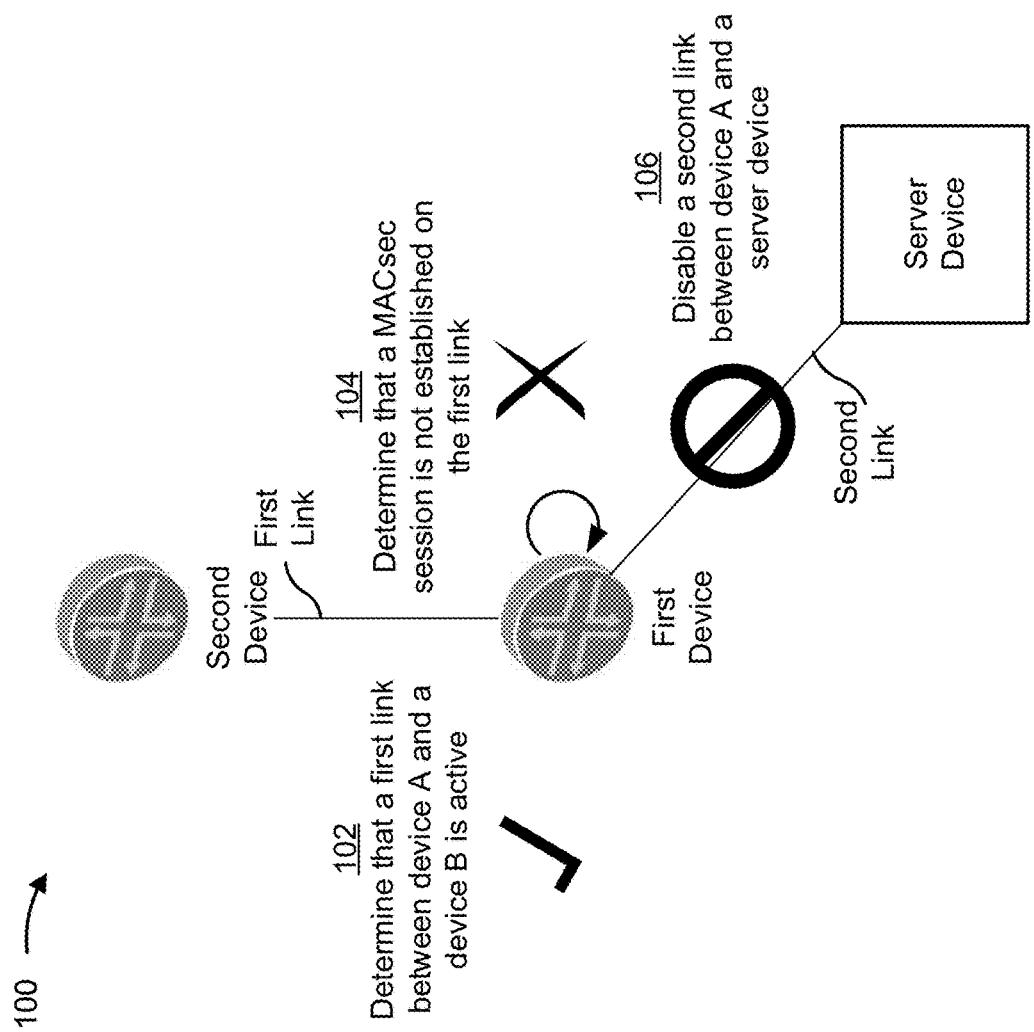

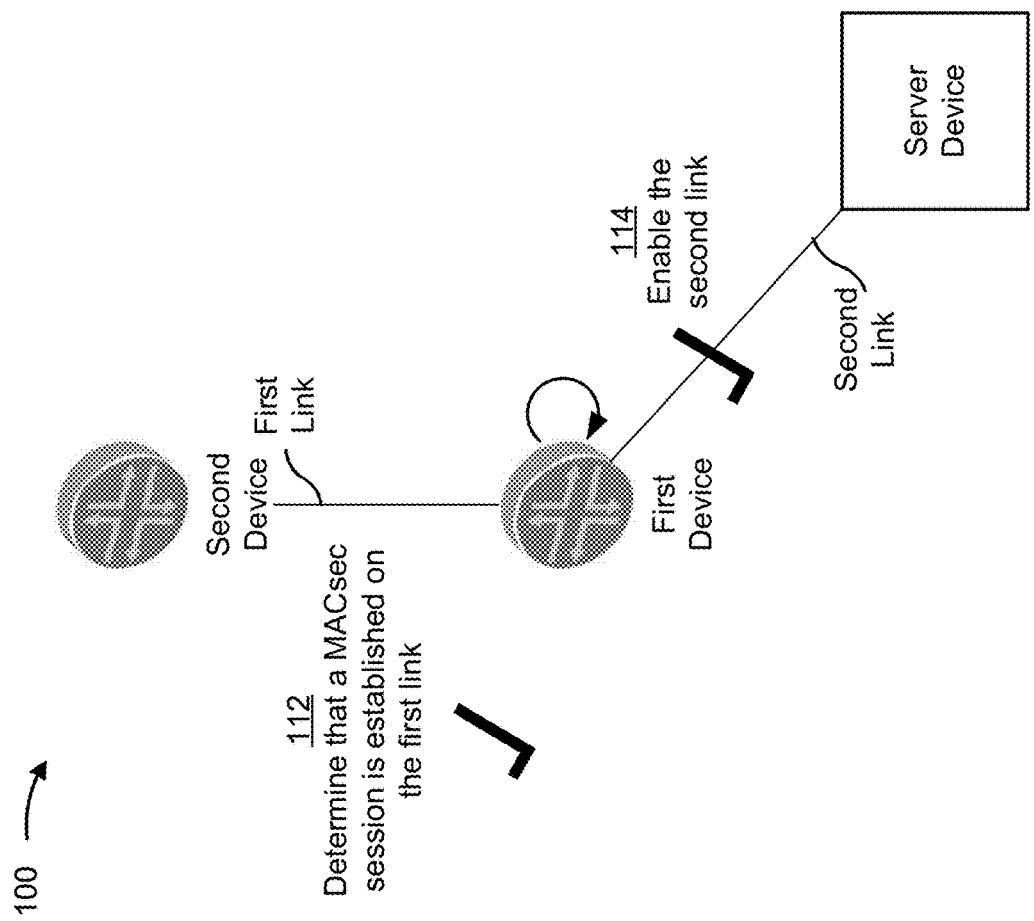

US 11,323,437 B1

MONITORING A MEDIA ACCESS CONTROL SECURITY SESSION

BACKGROUND

Media Access Control Security (MACsec) provides secure communication for traffic on physical links, such as Ethernet links. MACsec provides point-to-point security on links between directly connected devices. Moreover, a device may employ link failure detection on an uplink interface and propagate a detected failure to a downlink interface so that other devices connected to the downlink interface can switch to a secondary interface to maintain a flow of traffic.

SUMMARY

According to some implementations, a method may include determining, by a device, that a first link of the device is active; determining, by the device, whether a Media Access Control Security (MACsec) session is established on the first link; and selectively enabling or disabling, by the device, a second link of the device based on determining whether the MACsec session is established on the first link.

According to some implementations, a device may comprise one or more memories; and one or more processors, communicatively coupled to the one or more memories, to: determine that a first link between the device and an additional device is active; determine that a MACsec session is established on the first link; enable a second link between the device and a server device based on determining that the MACsec session is established; receive, after enabling the second link, data from the server device via the second link; and send the data to the additional device via the first link.

According to some implementations, a non-transitory computer-readable medium may store one or more instructions. The one or more instructions, when executed by one or more processors of a device, may cause the one or more processors to: determine that a plurality of first links between the device and an additional device are active; determine that a MACsec session is not established on any first link of the plurality of first links; disable a second link between the device and a server device based on determining that a MACsec session is not established on any first link of the plurality of first links; determine, after disabling the second link, that a MACsec session is established on at least one first link of the plurality of first links; enable the second link based on determining that the MACsec session is established on the at least one first link; receive, after enabling the second link, data from the server device via the second link; and send the data to the additional device via the at least one first link.

BRIEF DESCRIPTION OF THE DRAWINGS

FIGS. 1A-1F are diagrams of example implementations described herein.

FIGS. 4-6 are flow charts of example processes for a monitoring a link for establishment of a Media Access Control security (MACsec) session.

DETAILED DESCRIPTION

Figure 1B:
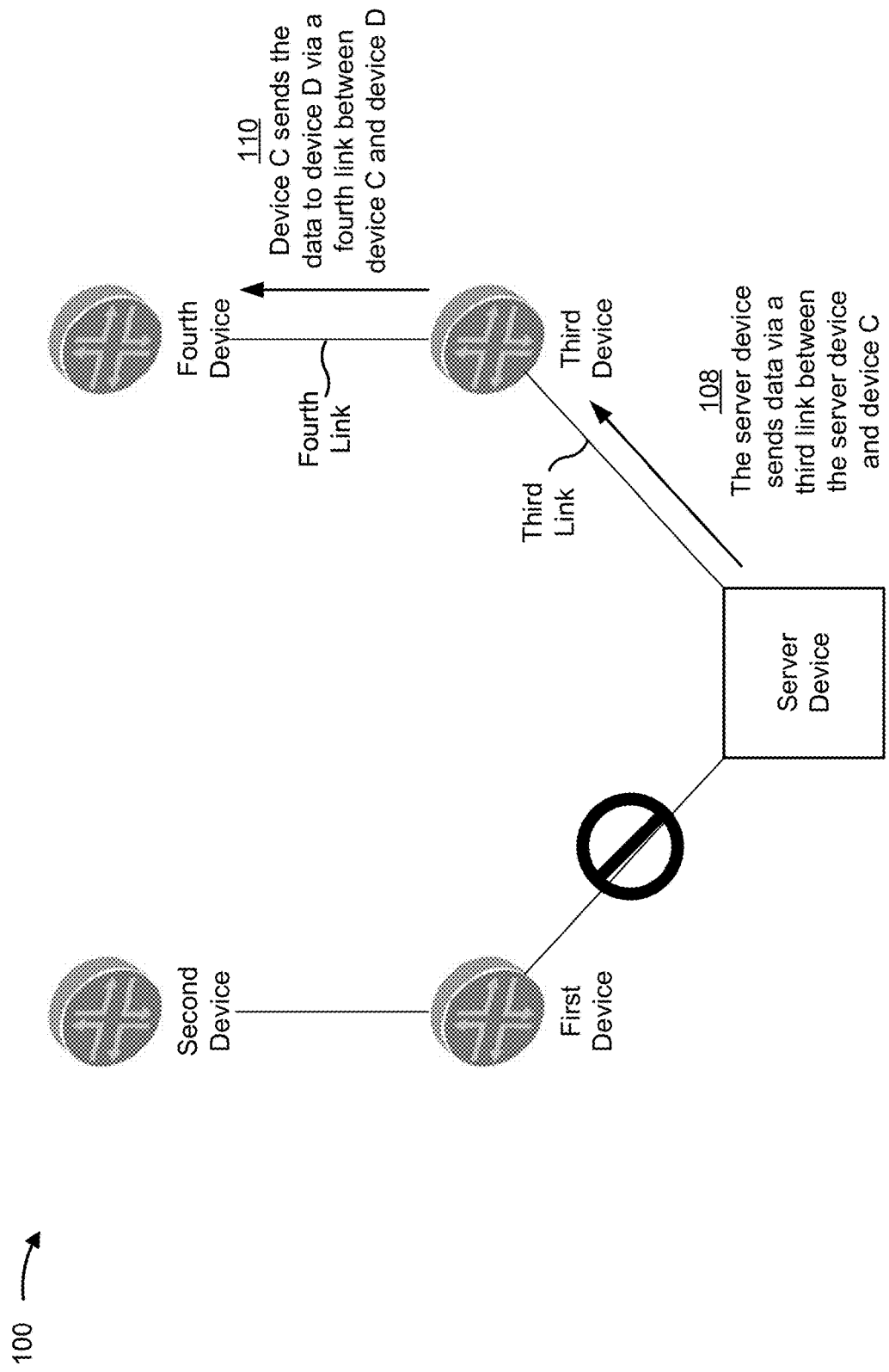

The following detailed description of example implementations refers to the accompanying drawings. The same reference numbers in different drawings may identify the same or similar elements.

Media Access Control Security (MACsec) provides point-to-point security on a physical link between two directly connected devices to ensure integrity of data transmitted between the two devices. Issues arise, however, when a MACsec session fails to be established on a link. For example, in some cases, a device, such as a router or switch, may receive data that is to be transmitted to an additional device via a link that has a MACsec session established. If a MACsec session is not established (or not yet established) on a link between the device and the additional device, the device may drop the data rather than forward the traffic via the link. This is often referred to as traffic blackholing.

Some implementations described herein provide a device that monitors a link for establishment of a MACsec session. In some implementations, the device may determine that a first link (or a set of first links) between the device and an additional device is active, and may determine whether a MACsec session is established on the first link (or a set of first links). In some implementations, when the device determines that a MACsec session is not established on the first link (or the set of first links), the device may disable a second link (or a set of second links) between the device and a server device, which prevents the server device from sending data to the device. In some implementations, when the device determines that a MACsec session is established on the first link (or the set of first links), the device may enable the second link (or the set of second links), which allows the server device to send data to the device. In some implementations, the device may receive, after enabling the second link (or the set of second links), the data from the server device via the second link (or the set of second links) and may send the data to the additional device via the first link (or the set of first links) (e.g., because a MACsec session is established on the first link or the set of first links).

In this way, some implementations described herein prevent traffic blackholing because the device only enables the second link when the device determines that a MACsec session is established on the first link. Accordingly, the device only receives traffic from the server device via the second link when the device is able to forward the traffic to the additional device via the first link. Moreover, some implementations described herein require only the device to perform operations to determine whether a MACsec session is established on the first link. This reduces an amount of time and/or resources (e.g., processing resources, memory resources, power resources, networking resources, and/or the like) that would otherwise be used by the additional device to assist in determining whether a MACsec session is established on the first link (e.g., by communicating heartbeat signals via a MACsec session on the first link).

FIGS. 1A-1F are diagrams of one or more example implementations 100 described herein. Example implementation(s) 100 may include a first device (shown in FIGS. 1A-1F as "first device"), a second device (shown in FIGS. 1A-1F as "second device"), a third device (shown in FIG. 1B as "third device"), a fourth device (shown in FIG. 1B as "fourth device"), and/or a server device (shown in FIGS. 1A-1F). The first device, the second device, the third device, and/or the fourth device may each include various types of network devices, such as a router, a gateway, a switch, a bridge, a wireless access point, a base station, a spine, a firewall, and/or the like. The first device, the second device, the third device, the fourth device, and/or the server device may be included in a network, such as a cellular network, a local area network (LAN), a core network, an access network, a wide area network (WAN) such as the Internet, a cloud network, and/or the like.

As shown in FIG. 1A, a first link may connect the first device to the second device. The first link may be a physical link, such as an Ethernet link. That is, the link may connect a physical port of the first device to a physical port of the second device. The first device and the second device may communicate data via the first link. Similarly, as shown in FIG. 1A, a second link may connect the first device to the server device. The second link may be a physical link, such as an Ethernet link, that connects a physical port of the first device to a physical port of the server device. The first device and the server device may communicate data via the second link.

In some implementations, the first device and/or the second device may be able to establish a MACsec session on the first link. For example, the first device and the second device may exchange security keys via the first link and verify the security keys to establish a MACsec session on the first link. In some implementations, the first device and/or the second device may initiate establishment of a MACsec session on the first link. Additionally, or alternatively, the first device may cause the second device (e.g., by sending a message to the second device) to initiate establishment of a MACsec session on the first link. In some implementations, the first device and or the second device may take a particular amount of time (e.g., 10 milliseconds, 100 milliseconds, 1 second, and/or the like) to establish a MACsec session on the first link (e.g., to exchange and verify security keys).

Additionally, or alternatively, the first device and/or the second device may not be able to establish a MACsec session on the first link. As an example, the first device and/or the second device may not be configured to establish a MACsec session. In an additional example, the first device and the second device may exchange mismatched security keys when attempting to establish a MACsec session on the first link, which may prevent the security keys from being verified by the first device and/or the second device. As another example, the first device may be configured to use a first encryption algorithm and the second device may be configured to use a second encryption algorithm, which may cause a cipher mismatch issue when the first device and the second device attempt to establish a MACsec session on the first link.

As shown by reference number 102, the first device may determine that the first link is active. That is, the first device may determine that a physical layer and/or a datalink layer of the first link has an active status, that power is being provided to the first link (e.g., the first link is powered up), and/or the like. Additionally, or alternatively, the first device may determine that the first link is inactive. That is, the first device may determine that a physical layer and/or a datalink layer of the first link has an inactive status, that power is not being provided to the first link (e.g., the first link is powered down), and/or the like.

In some implementations, the first device may determine whether a MACsec session is established on the first link (e.g., based on determining that the first link is active). For example, the first device may determine whether an authentication process associated with the MACsec session (e.g. exchanging and verifying security keys) was successful.

As shown by reference number 104, the first device may determine that a MACsec session is not established on the first link (e.g., by determining that an authentication process associated with the MACsec session was not successful). The MACsec session may not be established on the first link because the MACsec session is in a process of being established on the first link, the first device and/or the second device may not be able to establish a MACsec session for the reasons stated herein, and/or the like. In some implementations, the first device may determine that a MACsec session is not established on the first link after determining that that the first link is active (e.g., as described herein in relation to reference number 102) and/or determining that a MACsec session was established on the first link (e.g., as described herein in relation to reference number 112).

As shown by reference number 106, the first device may disable the second link (e.g., based on determining that a MACsec session is not established on the first link). For example, the first device may cause a physical layer and/or a datalink layer of the second link to be deactivated (e.g., change a status of the physical layer and/or the datalink layer of the second link to an inactive status). As another example, the first device may cause power to cease being provided to the second link (e.g., cause the second link to be powered down).

In some implementations, based on the second link being disabled, the server device and the first device may not be able to communicate. Accordingly, the server device may send data (e.g., that includes one or more packets) to a different device (e.g., for routing to a destination address). For example, as shown in FIG. 1B and by reference number 108, the server device may send the data to the third device via a third link. The third link may be a physical link, such as an Ethernet link, that connects a physical port of the server device to a physical port of the third device. Further, as shown by reference number 110, the third device may send the data to the fourth device via a fourth link. The fourth link may be a physical link, such as an Ethernet link, that connects a physical port of the third device to a physical port of the fourth device. In this example, a MACsec session may be established on the fourth link, which enables the third device to send the data to the fourth device via the fourth link. Additionally, or alternatively, the third device may send the data to the second device via the fourth link, instead of the fourth device. In this way, the data can be transmitted to a destination address (e.g., in this case, the second device) even when the second link is deactivated.

As shown in FIG. 1C and by reference number 112, the first device may determine that a MACsec session is established on the first link (e.g., by determining that an authentication process associated with the MACsec session was successful). For example, the first device may determine that the first device and the second device successfully exchanged and verified security keys (e.g., for establishing the MACsec session). The first device may determine that the MACsec session is established on the first link based on determining that the first link is active (e.g., as described herein in relation to reference number 102) and/or subsequent to determining that a MACsec session was not established on the first link (e.g., as described herein in relation to reference number 104).

Accordingly, as shown by reference number 114, the first device may enable the second link (e.g., based on determining that a MACsec session is established on the first link). For example, the first device may cause a physical layer and/or a datalink layer of the second link to be activated (e.g., change a status of the physical layer and/or the datalink layer of the second link to an active status). As another example, the first device may cause power to be provided to the second link (e.g., cause the second link to be powered up).

Figure 1D:
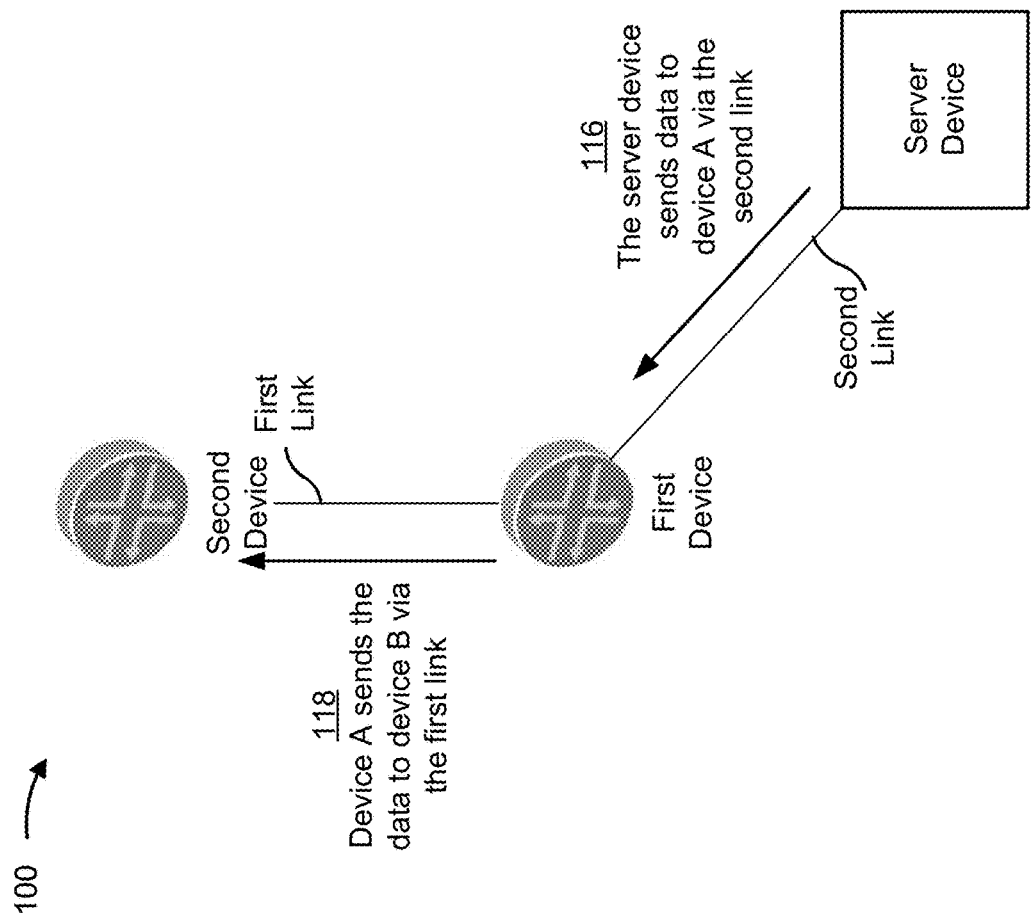

In some implementations, based on the second link being enabled, the server device and the first device may be able to communicate. Accordingly, as shown in FIG. 1D and by reference number 116, the server device may send data (e.g., that includes one or more packets) to the first device (e.g., for routing to a destination address) via the second link. Further, as shown by reference number 118, the first device may send the data to the second device via the first link (e.g., because the first link is active and the MACsec session is established on the first link).

In some implementations, the first device may process the data before sending the data to the second device via the first link. That is, the first device may cause the data to be formatted for transmission via a MACsec session and may send the formatted data to the second device via the first link. For example, the first device may cause the data to be encrypted using an encryption algorithm associated with the MACsec session and may send, after causing the data to be encrypted, the data to the second device via the first link.

In some implementations, the second device may send additional data to the first device via the first link (e.g., because the first link is active and a MACsec session is established on the first link). Accordingly, the first device may send the additional data to the server device via the second link (e.g., because the second link is active).

Figure 1E:
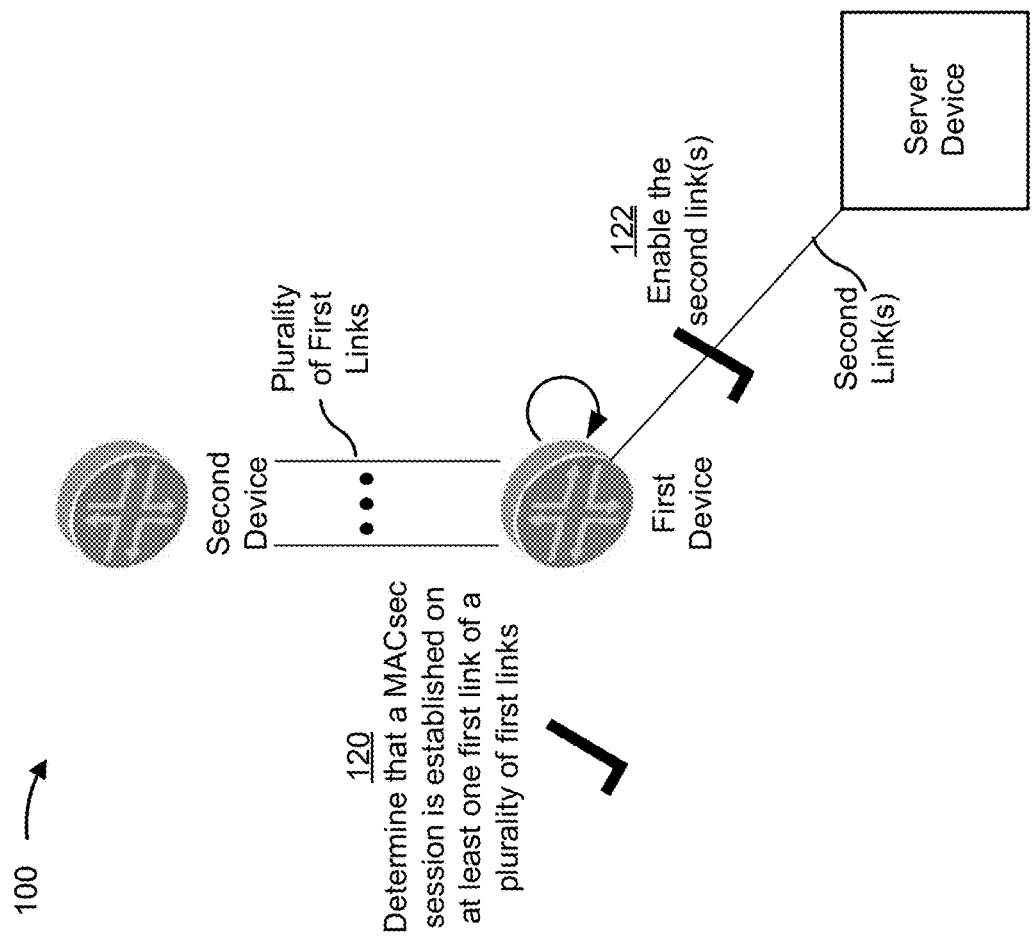
Figure 1F:
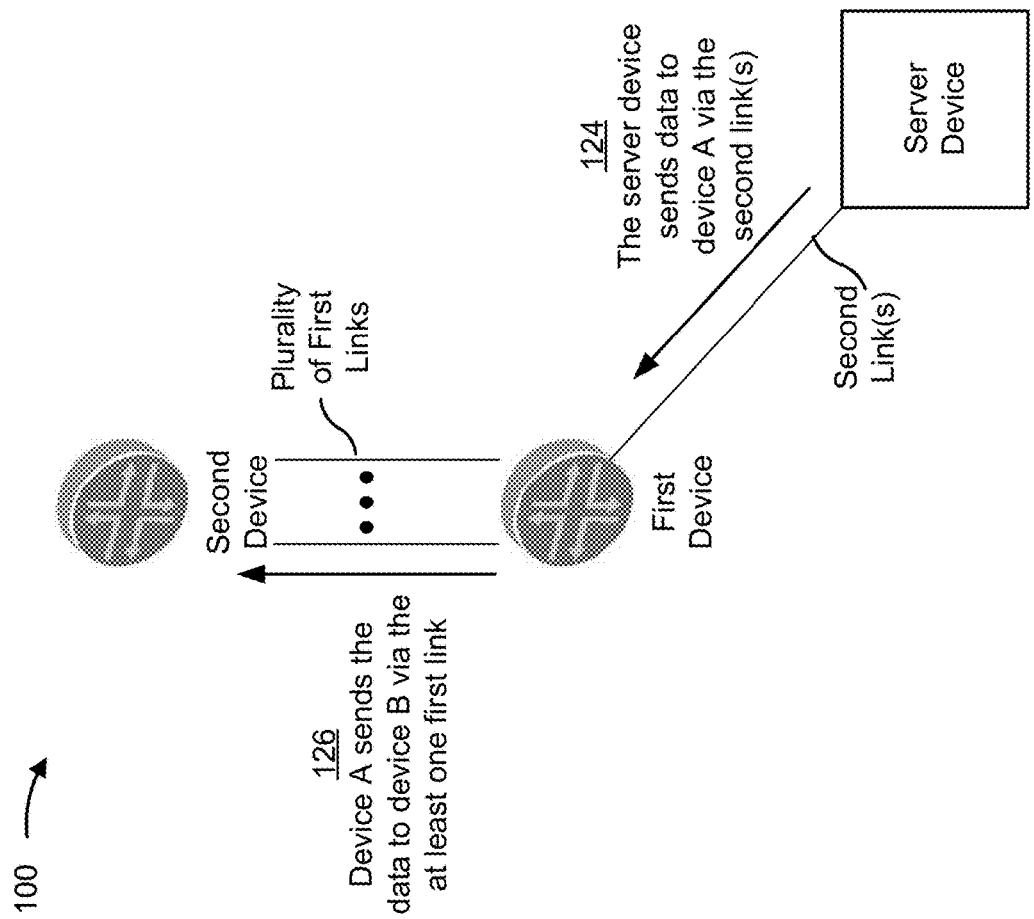

While some implementations described herein concern the first device being connected to the second device via a single link, additional implementations are contemplated. As shown in FIG. 1E, a plurality of first links connect the first device to the second device. Each first link of the plurality of first links may be a physical link, such as an Ethernet link, that may connect a physical port of the first device to a physical port of the second device. The first device and/or the second device may or may not be able to establish a respective MACsec session on each first link of the plurality of first links in a similar manner as described herein in relation to FIG. 1A.

In some implementations, the first device may determine that one or more first links of the plurality of links are active or inactive, in a similar manner as described herein in relation to FIG. 1A. For example, the first device may determine that a respective physical layer and/or a datalink layer of each first link, of the one or more first links, has an active status, that power is being provided to each first link (e.g., each first link is powered up), and/or the like. As another example, the first device may determine that a respective physical layer and/or a datalink layer of each first link, of the one or more first links, has an inactive status, that power is not being provided to each first link (e.g., each first link is powered down), and/or the like.

In some implementations, the first device may determine whether a respective MACsec session is established on one or more of the one or more first links (e.g., based on determining that the one or more links are active), in a similar manner as described herein in relation to FIG. 1A. In some implementations, the first device may determine that a MACsec session is not established on any first link of the one or more first links. For example, the first device may determine, for each first link of the one or more first links, that a MACsec authentication process associated with the first link was not successful.

Accordingly, the first device may disable one or more second links that connect the first device and the server device (e.g., based on determining that a MACsec session is not established on any first link of the one or more first links), in a similar manner as described herein in relation to FIG. 1A. For example, the first device may cause a physical layer and/or a datalink layer of the one or more second links to be deactivated (e.g., change a status of the physical layer and/or the datalink layer of the one or more second links to an inactive status), cause power to cease being provided to the one or more second links (e.g., cause the one or more second links to be powered down), and/or the like.

In some implementations, as shown by reference number 120, the first device may determine that a MACsec session is established on at least one first link of the one or more first links, in a similar manner as described herein in relation to FIG. 1C and reference number 112. For example, the first device may determine that the first device and the second device successfully exchanged and verified security keys associated with a MACsec session via the at least one first link.

Accordingly, as shown by reference number 122, the first device may enable the one or more second links (e.g., based on determining that a MACsec session is established on the at least one first link of the one or more first links). For example, the first device may cause a physical layer and/or a datalink layer of the one or more seconds link to be activated (e.g., change a status of the physical layer and/or the datalink layer of the one or more second links to an active status), cause power to be provided to the one or more second links (e.g., cause the one or more second links to be powered up), and/or the like.

In some implementations, based on the one or more second links being enabled, the server device may send data (e.g., that includes one or more packets) to the first device (e.g., for routing to a destination address), in a similar manner as described herein in relation to FIG. 1D and reference number 116. For example, as shown by reference number 124, the server device may send the data to the first device via the one or more second links. Further, as shown by reference number 126, the first device may send the data to the second device via the at least one first link (e.g., because the at least one first link is active and a MACsec session is established on the at least one first link), in a similar manner as described herein in relation to FIG. 1D and reference number 118.

In some implementations, the first device may process the data before sending the data to the second device via the at least one first link, in a similar manner as described herein in relation to FIG. 1D. For example, the first device may cause the data to be formatted for transmission via a MACsec session (e.g., cause the data to be encrypted using an encryption algorithm associated with the MACsec session) and may send the formatted data (e.g., the encrypted data) to the second device via the at least one first link.

In some implementations, the second device may send first additional data to the first device via the at least one first link (e.g., because the at least one first link is active and a MACsec session is established on the at least one first link). Accordingly, the first device may send the first additional data to the server device via the one or more second links (e.g., because the one or more second links are active).

Additionally, or alternatively, the first device may determine (e.g., after sending the data to the second device via the at least one first link and/or sending the first additional data to the server device via the one or more second links), that a MACsec session is established on at least one additional first link of the one or more first links, in similar manner as described herein in relation to FIG. 1E. Accordingly, the first device may receive second additional data from the server device via the one or more second links and may send the second additional data to the second device via the at least one first link and/or the at least one additional first link, in a similar manner as described herein in relation to FIG. 1F.

While some implementations described herein describe operations being performed in association with the first device, second device, third device, and/or fourth device receiving and/or sending data from or to the server device, additional implementations contemplate the operations being performed in associating with the first device, second device, third device, and/or fourth device receiving and/or sending data from or to any device (e.g., a fifth device). that includes various types of network devices, such as a router, a gateway, a switch, a bridge, a wireless access point, a base station, a spine, a firewall, and/or the like.

As indicated above, FIGS. 1A-1F are provided merely as one or more examples. Other examples may differ from what is described with regard to FIGS. 1A-1F.

Figure 2:
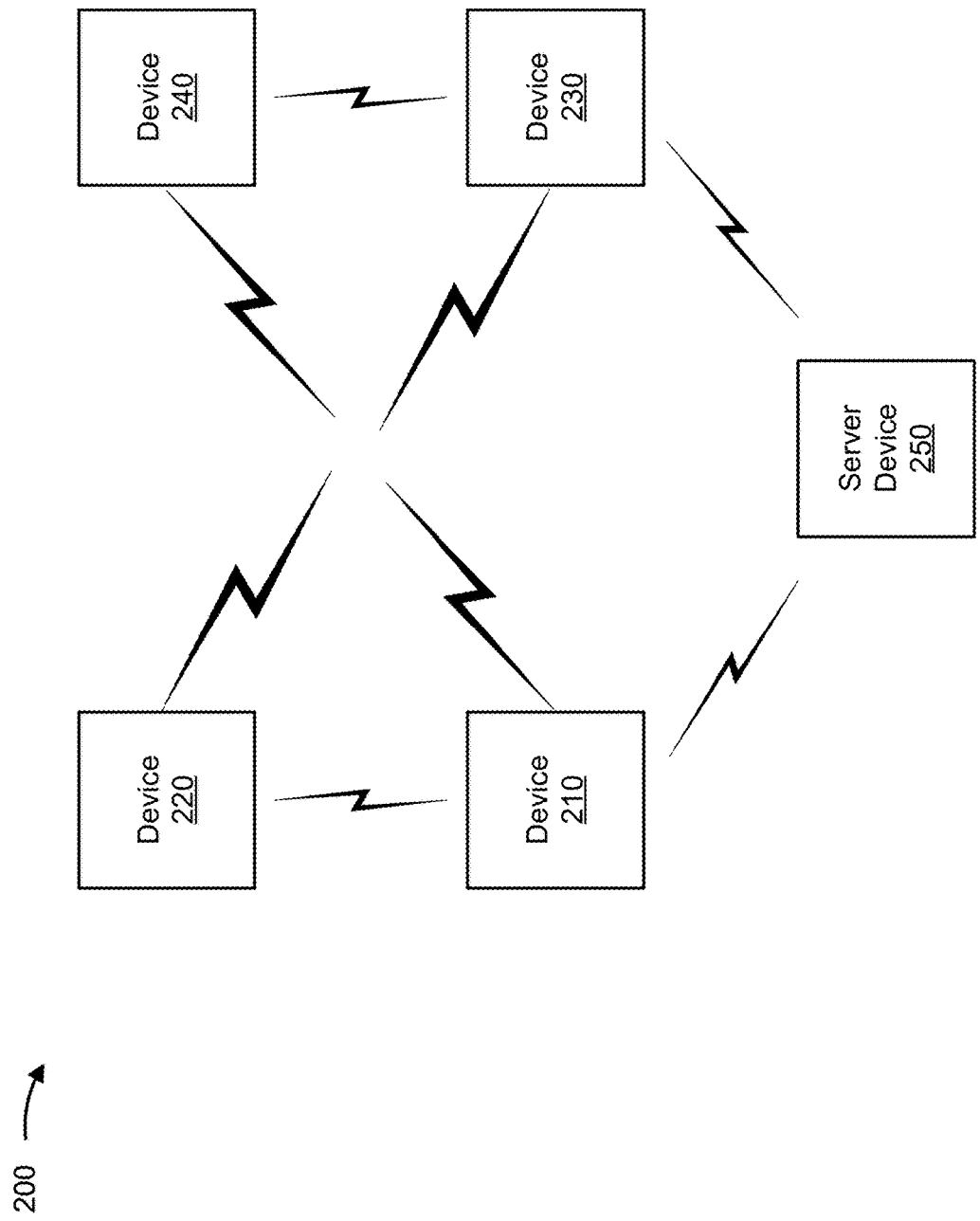
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include device 210, device 220, device 230, device 240, and/or server device 250. Devices of environment 200 may interconnect via wired connections, wireless connections, or a combination of wired and wireless connections.

Device 210 includes one or more devices capable of receiving, storing, generating, processing, forwarding, and/or transferring information. For example, device 210 may include a router, a switch (e.g., a top-of-rack (TOR) switch), a gateway, a firewall device, a modem, a hub, a bridge, a network interface controller (NIC), a reverse proxy, a server (e.g., a proxy server), a multiplexer, a security device, an intrusion detection device, a load balancer, or a similar device. In some implementations, device 210 may be a physical device implemented within a housing, such as a chassis. In some implementations, device 210 may be a virtual device implemented by one or more computer devices of a cloud computing environment or a data center. In some implementations, device 210 may communicate with device 220 via at least one first link and may communicate with server device 250 via at least one second link. In some implementations, device 210 may communicate with device 240 via at least one additional link. In some implementations, a MACsec session may be established on the at least one first link.

Device 220 includes one or more devices capable of receiving, storing, generating, processing, forwarding, and/or transferring information. For example, device 220 may include a router, a switch, a gateway, a firewall device, a modem, a hub, a bridge, a network interface controller (NIC), a reverse proxy, a server (e.g., a proxy server), a multiplexer, a security device, an intrusion detection device, a load balancer, a spine, or a similar device. In some implementations, device 220 may be a physical device implemented within a housing, such as a chassis. In some implementations, device 220 may be a virtual device implemented by one or more computer devices of a cloud computing environment or a data center. In some implementations, device 220 may communicate with device 210 via at least one link and may communicate with device 230 via at least one additional link. In some implementations, a MACsec session may be established on the at least one link.

Device 230 includes one or more devices capable of receiving, storing, generating, processing, forwarding, and/or transferring information. For example, device 230 may include a router, a switch (e.g., a top-of-rack (TOR) switch), a gateway, a firewall device, a modem, a hub, a bridge, a network interface controller (NIC), a reverse proxy, a server (e.g., a proxy server), a multiplexer, a security device, an intrusion detection device, a load balancer, or a similar device. In some implementations, device 230 may be a physical device implemented within a housing, such as a chassis. In some implementations, device 230 may be a virtual device implemented by one or more computer devices of a cloud computing environment or a data center. In some implementations, device 230 may communicate with device 240 via at least one first link and may communicate with server device 250 via at least one second link. In some implementations, device 230 may communicate with device 220 via at least one additional link. In some implementations, a MACsec session may be established on the at least one first link.

Device 240 includes one or more devices capable of receiving, storing, generating, processing, forwarding, and/or transferring information. For example, device 240 may include a router, a switch, a gateway, a firewall device, a modem, a hub, a bridge, a network interface controller (NIC), a reverse proxy, a server (e.g., a proxy server), a multiplexer, a security device, an intrusion detection device, a load balancer, a spine, or a similar device. In some implementations, device 240 may be a physical device implemented within a housing, such as a chassis. In some implementations, device 240 may be a virtual device implemented by one or more computer devices of a cloud computing environment or a data center. In some implementations, device 240 may communicate with device 230 via at least one link and may communicate with device 210 via at least one additional link. In some implementations, a MACsec session may be established on the at least one link.

Server device 250 includes one or more devices capable of receiving, generating, storing, processing, and/or providing information, such as information described herein. For example, server device 250 may include a laptop computer, a tablet computer, a desktop computer, a server, a group of servers, or a similar type of device. In some implementations, server device 250 may communicate with device 210 via a first link (e.g., using a first network interface controller (NIC) of the server device 250) and/or may communicate with device 230 via a second link (e.g., using a second NIC of the server device 250).

The number and arrangement of devices and networks shown in FIG. 2 are provided as one or more examples. In practice, there may be additional devices, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3A:
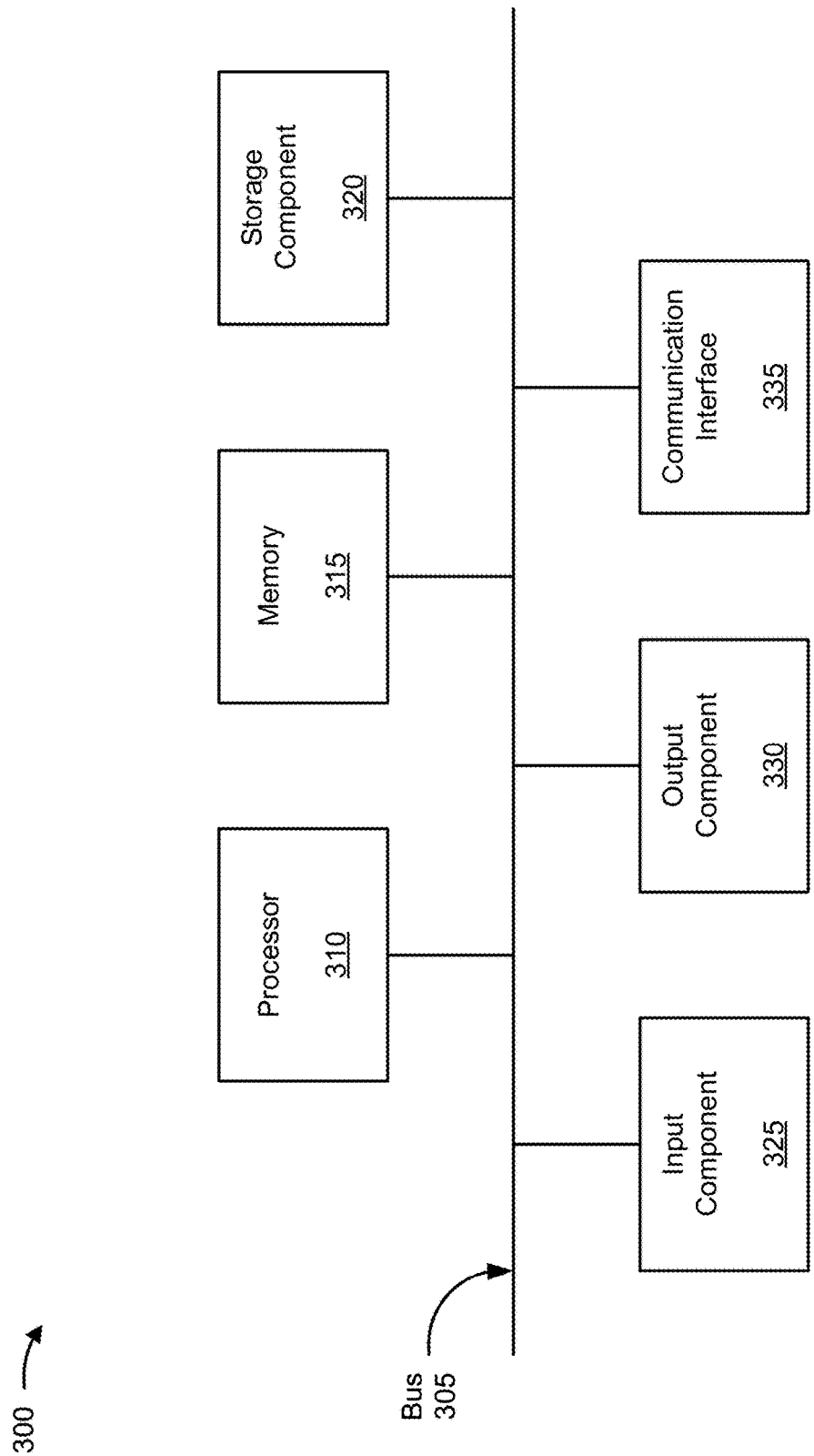
FIGS. 3A and 3B are diagrams of example components of one or more devices of FIG. 2.
Figure 3B:
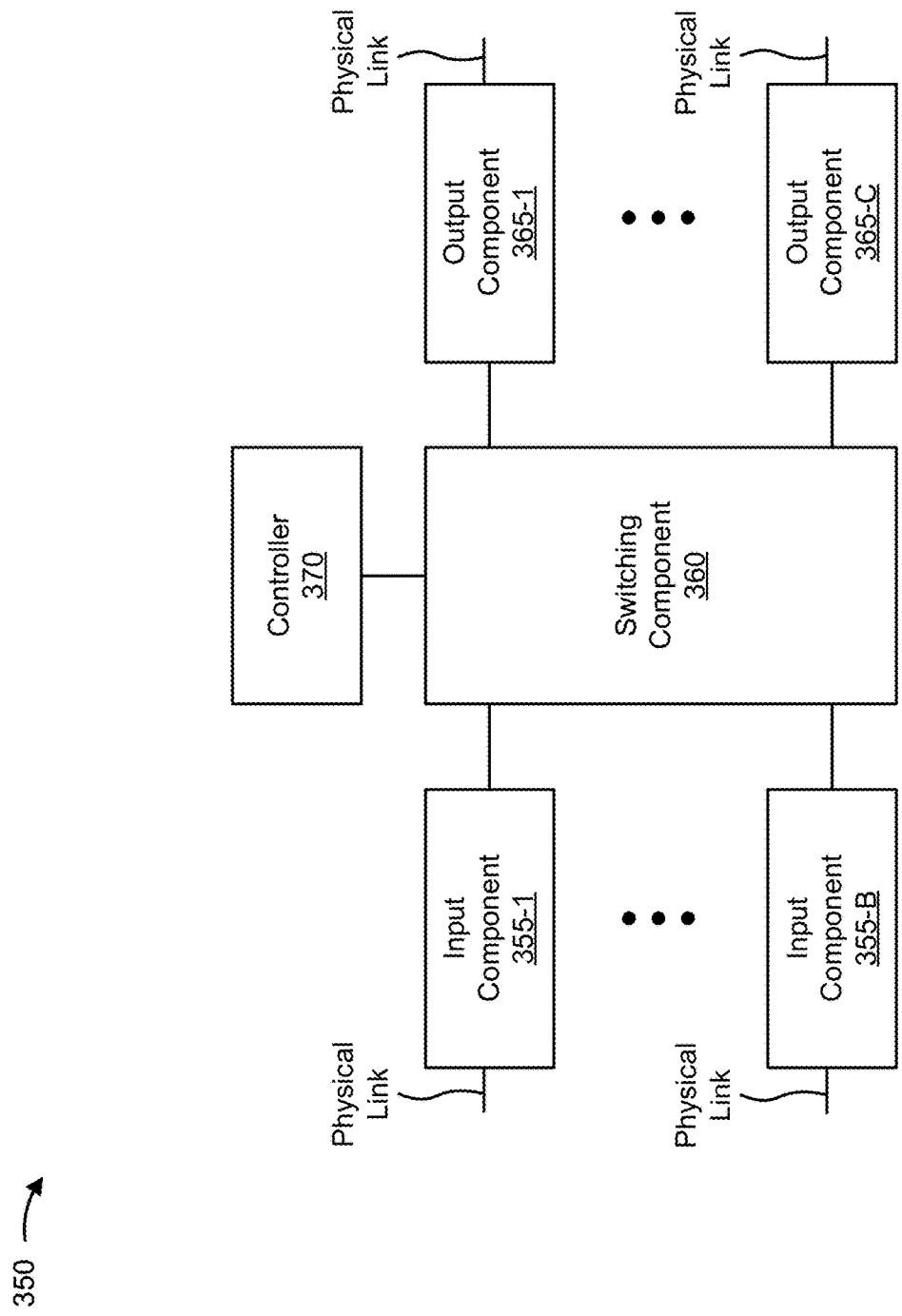

FIGS. 3A-3B are diagrams of example components of one or more devices of FIG. 2. FIG. 3A is a diagram of example components of a device 300. Device 300 may correspond to device 210, device 220, device 230, device 240, server device 250 and/or the like. In some implementations, device 210, device 220, device 230, device 240, server device 250 and/or the like may include one or more devices 300 and/or one or more components of device 300. As shown in FIG. 3A, device 300 may include a bus 305, a processor 310, a memory 315, a storage component 320, an input component 325, an output component 330, and a communication interface 335.

Bus 305 includes a component that permits communication among the components of device 300. Processor 310 is implemented in hardware, firmware, or a combination of hardware and software. Processor 310 takes the form of a central processing unit (CPU), a graphics processing unit (GPU), an accelerated processing unit (APU), a microprocessor, a microcontroller, a digital signal processor (DSP), a field-programmable gate array (FPGA), an ASIC, or another type of processing component. In some implementations, processor 310 includes one or more processors capable of being programmed to perform a function. Memory 315 includes a random access memory (RAM), a read only memory (ROM), and/or another type of dynamic or static storage device (e.g., a flash memory, a magnetic memory, and/or an optical memory) that stores information and/or instructions for use by processor 310.

Storage component 320 stores information and/or software related to the operation and use of device 300. For example, storage component 320 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 325 includes a component that permits device 300 to receive information, such as via user input (e.g., a touch screen display, a keyboard, a keypad, a mouse, a button, a switch, and/or a microphone). Additionally, or alternatively, input component 325 may include a sensor for sensing information (e.g., a global positioning system (GPS) component, an accelerometer, a gyroscope, and/or an actuator). Output component 330 includes a component that provides output information from device 300 (e.g., a display, a speaker, and/or one or more light-emitting diodes (LEDs)).

Communication interface 335 includes a transceiver-like component (e.g., a transceiver and/or a separate receiver and transmitter) that enables device 300 to communicate with other devices, such as via a wired connection, a wireless connection, or a combination of wired and wireless connections. Communication interface 335 may permit device 300 to receive information from another device and/or provide information to another device. For example, communication interface 335 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 310 executing software instructions stored by a non-transitory computer-readable medium, such as memory 315 and/or storage component 320. A computer-readable medium is defined herein as a non-transitory memory device. A memory device includes memory space within a single physical storage device or memory space spread across multiple physical storage devices.

Software instructions may be read into memory 315 and/or storage component 320 from another computer-readable medium or from another device via communication interface 335. When executed, software instructions stored in memory 315 and/or storage component 320 may cause processor 310 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3A are provided as an example. In practice, device 300 may include additional components, fewer components, different components, or differently arranged components than those shown in FIG. 3A. Additionally, or alternatively, a set of components (e.g., one or more components) of device 300 may perform one or more functions described as being performed by another set of components of device 300.

FIG. 3B is a diagram of example components of a device 350. Device 350 may correspond to device 210, device 220, device 230, device 240, server device 250 and/or the like. In some implementations, device 210, device 220, device 230, device 240, server device 250 and/or the like may include one or more devices 350 and/or one or more components of device 350. As shown in FIG. 3B, device 350 may include one or more input components 355-1 through 355-B (B≥1) (hereinafter referred to collectively as input components 355, and individually as input component 355), a switching component 360, one or more output components 365-1 through 365-C (C≥1) (hereinafter referred to collectively as output components 365, and individually as output component 365), and a controller 370.

Input component 355 may be points of attachment for physical links and may be points of entry for incoming traffic, such as packets. Input component 355 may process incoming traffic, such as by performing data link layer encapsulation or decapsulation. In some implementations, input component 355 may send and/or receive packets. In some implementations, input component 355 may include an input line card that includes one or more packet processing components (e.g., in the form of integrated circuits), such as one or more interface cards (IFCs), packet forwarding components, line card controller components, input ports, processors, memories, and/or input queues. In some implementations, device 350 may include one or more input components 355.

Switching component 360 may interconnect input components 355 with output components 365. In some implementations, switching component 360 may be implemented via one or more crossbars, via busses, and/or with shared memories. The shared memories may act as temporary buffers to store packets from input components 355 before the packets are eventually scheduled for delivery to output components 365. In some implementations, switching component 360 may enable input components 355, output components 365, and/or controller 370 to communicate.

Output component 365 may store packets and may schedule packets for transmission on output physical links. Output component 365 may support data link layer encapsulation or decapsulation, and/or a variety of higher-level protocols. In some implementations, output component 365 may send packets and/or receive packets. In some implementations, output component 365 may include an output line card that includes one or more packet processing components (e.g., in the form of integrated circuits), such as one or more IFCs, packet forwarding components, line card controller components, output ports, processors, memories, and/or output queues. In some implementations, device 350 may include one or more output components 365. In some implementations, input component 355 and output component 365 may be implemented by the same set of components (e.g., and input/output component may be a combination of input component 355 and output component 365).

Controller 370 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 370 may include one or more processors that can be programmed to perform a function.

In some implementations, controller 370 may include a RAM, a ROM, and/or another type of dynamic or static storage device (e.g., a flash memory, a magnetic memory, an optical memory, etc.) that stores information and/or instructions for use by controller 370.

In some implementations, controller 370 may communicate with other devices, networks, and/or systems connected to device 300 to exchange information regarding network topology. Controller 370 may create routing tables based on the network topology information, create forwarding tables based on the routing tables, and forward the forwarding tables to input components 355 and/or output components 365. Input components 355 and/or output components 365 may use the forwarding tables to perform route lookups for incoming and/or outgoing packets.

Controller 370 may perform one or more processes described herein. Controller 370 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 370 from another computer-readable medium or from another device via a communication interface. When executed, software instructions stored in a memory and/or storage component associated with controller 370 may cause controller 370 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3B are provided as an example. In practice, device 350 may include additional components, fewer components, different components, or differently arranged components than those shown in FIG. 3B. Additionally, or alternatively, a set of components (e.g., one or more components) of device 350 may perform one or more functions described as being performed by another set of components of device 350.

Figure 4:
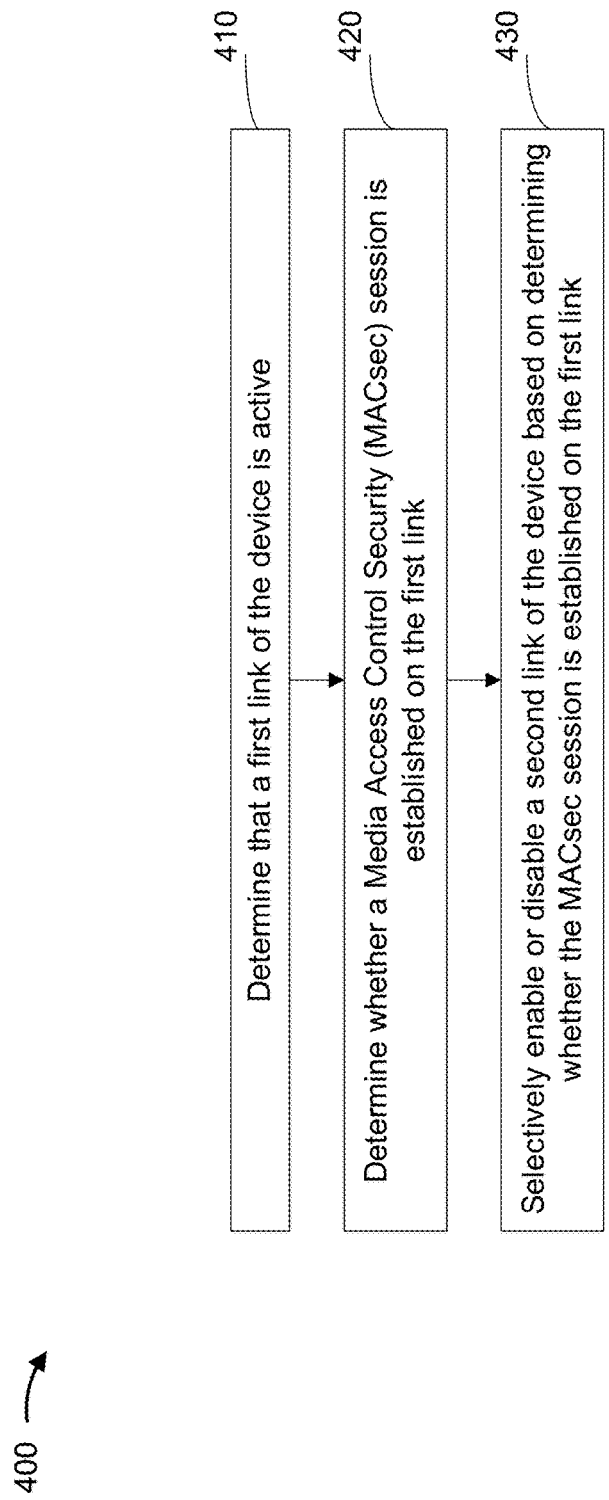

FIG. 4 is a flowchart of an example process 400 for monitoring a link for establishment of a Media Access Control Security (MACsec) session. In some implementations, one or more process blocks of FIG. 4 may be performed by a first device (e.g., device 210). In some implementations, one or more process blocks of FIG. 4 may be performed by another device or a group of devices (e.g., device 220, device 230, device 240, and/or the like) separate from or including the device.

As shown in FIG. 4, process 400 may include determining that a first link of the device is active (block 410). For example, the device (e.g., using processor 310, memory 315, storage component 320, input component 325, output component 330, communication interface 335, input component 355, switching component 360, output component 365, controller 370, and/or the like) may determine that a first link of the device is active, as described above.

As further shown in FIG. 4, process 400 may include determining whether a MACsec session is established on the first link (block 420). For example, the device (e.g., using processor 310, memory 315, storage component 320, input component 325, output component 330, communication interface 335, input component 355, switching component 360, output component 365, controller 370, and/or the like) may determine whether a MACsec session is established on the first link, as described above.

As further shown in FIG. 4, process 400 may include selectively enabling or disabling a second link of the device based on determining whether the MACsec session is established on the first link (block 430). For example, the device (e.g., using processor 310, memory 315, storage component 320, input component 325, output component 330, communication interface 335, input component 355, switching component 360, output component 365, controller 370, and/or the like) may selectively enable or disable a second link of the device based on determining whether the MACsec session is established on the first link, as described above.

Process 400 may include additional implementations, such as any single implementation or any combination of implementations described below and/or in connection with one or more other processes described elsewhere herein.

In a first implementation, the first link connects the device and a routing device.

In a second implementation, alone or in combination with the first implementation, the second link connects the device and a server device.

In a third implementation, alone or in combination with one or more of the first and second implementations, the device may receive, after enabling the second link, data from a server device via the second link and may send the data to a different device via the first link.

In a fourth implementation, alone or in combination with one or more of the first through third implementations, determining whether the MACsec session is established on the first link comprises determining whether an authentication process associated with the MACsec session was successful.

In a fifth implementation, alone or in combination with one or more of the first through fourth implementations, determining that the first link is active comprises determining that a physical layer of the first link has an active status.

In a sixth implementation, alone or in combination with one or more of the first through fifth implementations, enabling the second link comprises causing a physical layer of the second link to be activated.

In a seventh implementation, alone or in combination with one or more of the first through sixth implementations, disabling the second link comprises causing a physical layer of the second link to be deactivated.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
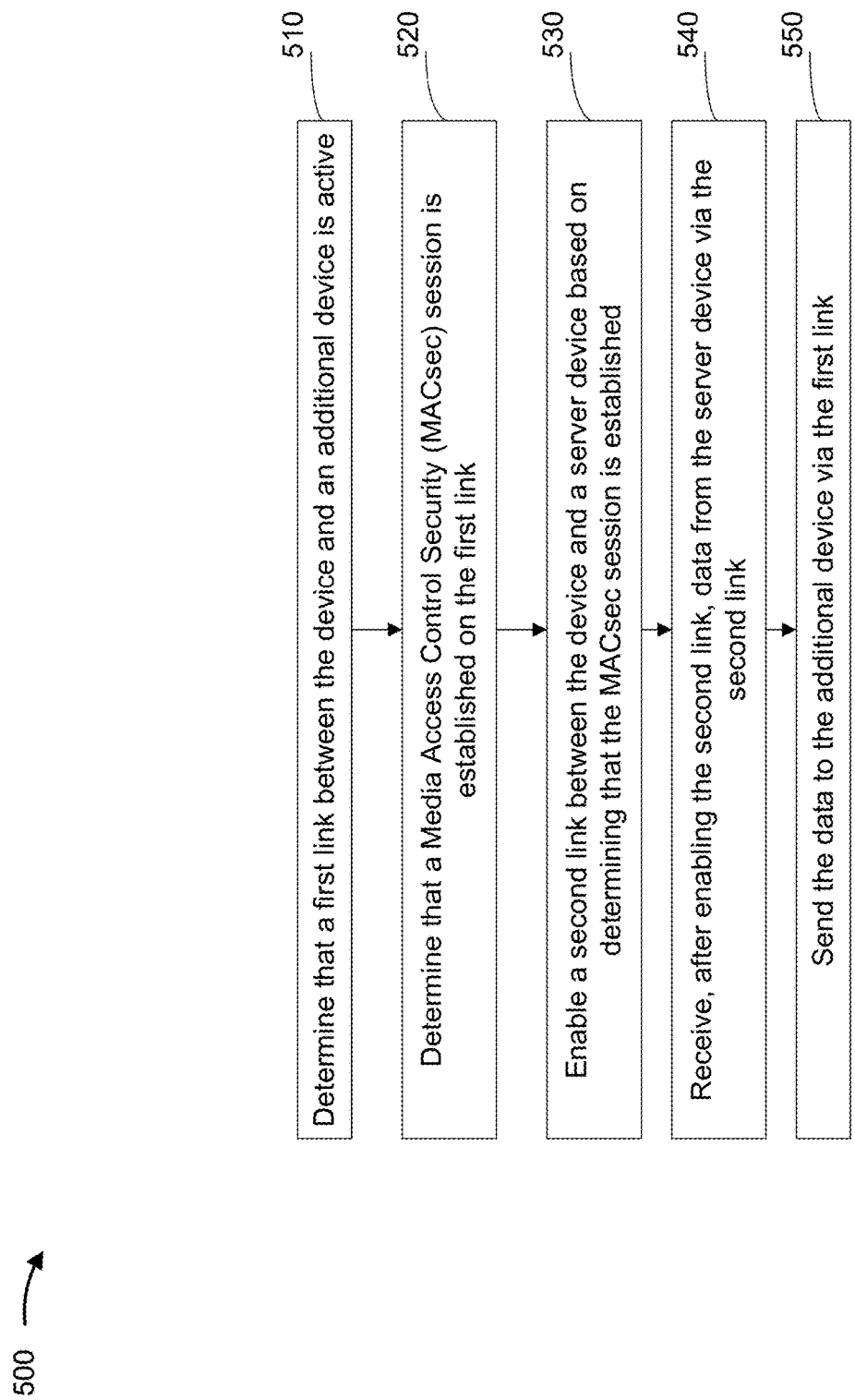

FIG. 5 is a flowchart of an example process 500 for monitoring a link for establishment of a MACsec session. In some implementations, one or more process blocks of FIG. 5 may be performed by a first device (e.g., device 210). In some implementations, one or more process blocks of FIG. 5 may be performed by another device or a group of devices (e.g., device 220, device 230, device 240, and/or the like) separate from or including the device.

As shown in FIG. 5, process 500 may include determining that a first link between the device and an additional device is active (block 510). For example, the device (e.g., using processor 310, memory 315, storage component 320, input component 325, output component 330, communication interface 335, input component 355, switching component 360, output component 365, controller 370, and/or the like) may determine that a first link between the device and an additional device is active, as described above.

As further shown in FIG. 5, process 500 may include determining that a MACsec session is established on the first link (block 520). For example, the device (e.g., using processor 310, memory 315, storage component 320, input component 325, output component 330, communication interface 335, input component 355, switching component 360, output component 365, controller 370, and/or the like) may determine that a MACsec session is established on the first link, as described above.

As further shown in FIG. 5, process 500 may include enabling a second link between the device and a server device based on determining that the MACsec session is established (block 530). For example, the device (e.g., using processor 310, memory 315, storage component 320, input component 325, output component 330, communication interface 335, input component 355, switching component 360, output component 365, controller 370, and/or the like) may enable a second link between the device and a server device based on determining that the MACsec session is established, as described above.

As further shown in FIG. 5, process 500 may include receiving, after enabling the second link, data from the server device via the second link (block 540). For example, the device (e.g., using processor 310, memory 315, storage component 320, input component 325, output component 330, communication interface 335, input component 355, switching component 360, output component 365, controller 370, and/or the like) may receive, after enabling the second link, data from the server device via the second link, as described above.

As further shown in FIG. 5, process 500 may include sending the data to the additional device via the first link (block 550). For example, the device (e.g., using processor 310, memory 315, storage component 320, input component 325, output component 330, communication interface 335, input component 355, switching component 360, output component 365, controller 370, and/or the like) may send the data to the additional device via the first link, as described above.

Process 500 may include additional implementations, such as any single implementation or any combination of implementations described below and/or in connection with one or more other processes described elsewhere herein.

In a first implementation, determining that the MACsec session is established on the first link comprises determining that the device and the additional device successfully exchanged and verified security keys.

In a second implementation, alone or in combination with the first implementation, determining that the first link is active comprises determining that a physical layer of the first link and a data link layer of the first link have an active status.

In a third implementation, alone or in combination with one or more of the first and second implementations, enabling the second link comprises causing a physical layer and a data link layer of the second link to be activated.

In a fourth implementation, alone or in combination with one or more of the first through third implementations, sending the data to the additional device via the first link comprises causing the data to be encrypted using an encryption algorithm associated with the MACsec session and sending, after causing the data to be encrypted, the data to the additional device via the first link.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for monitoring a link for establishment of a MACsec session. In some implementations, one or more process blocks of FIG. 6 may be performed by a first device (e.g., device 210). In some implementations, one or more process blocks of FIG. 6 may be performed by another device or a group of devices (e.g., device 220, device 230, device 240, and/or the like) separate from or including the device.

As shown in FIG. 6, process 600 may include determining that a plurality of first links between the device and an additional device are active (block 610). For example, the device (e.g., using processor 310, memory 315, storage component 320, input component 325, output component 330, communication interface 335, input component 355, switching component 360, output component 365, controller 370, and/or the like) may determine that a plurality of first links between the device and an additional device are active, as described above.

As further shown in FIG. 6, process 600 may include determining that a MACsec session is not established on any first link of the plurality of first links (block 620). For example, the device (e.g., using processor 310, memory 315, storage component 320, input component 325, output component 330, communication interface 335, input component 355, switching component 360, output component 365, controller 370, and/or the like) may determine that a MACsec session is not established on any first link of the plurality of first links, as described above.

As further shown in FIG. 6, process 600 may include disabling a second link between the device and a server device based on determining that a MACsec session is not established on any first link of the plurality of first links (block 630). For example, the device (e.g., using processor 310, memory 315, storage component 320, input component 325, output component 330, communication interface 335, input component 355, switching component 360, output component 365, controller 370, and/or the like) may disable a second link between the device and a server device based on determining that a MACsec session is not established on any first link of the plurality of first links, as described above.

As further shown in FIG. 6, process 600 may include determining, after disabling the second link, that a MACsec session is established on at least one first link of the plurality of first links (block 640). For example, the device (e.g., using processor 310, memory 315, storage component 320, input component 325, output component 330, communication interface 335, input component 355, switching component 360, output component 365, controller 370, and/or the like) may determine, after disabling the second link, that a MACsec session is established on at least one first link of the plurality of first links, as described above.

As further shown in FIG. 6, process 600 may include enabling the second link based on determining that the MACsec session is established on the at least one first link (block 650). For example, the device (e.g., using processor 310, memory 315, storage component 320, input component 325, output component 330, communication interface 335, input component 355, switching component 360, output component 365, controller 370, and/or the like) may enable the second link based on determining that the MACsec session is established on the at least one first link, as described above.

As further shown in FIG. 6, process 600 may include receiving, after enabling the second link, data from the server device via the second link (block 660). For example, the device (e.g., using processor 310, memory 315, storage component 320, input component 325, output component 330, communication interface 335, input component 355, switching component 360, output component 365, controller 370, and/or the like) may receive, after enabling the second link, data from the server device via the second link, as described above.

As further shown in FIG. 6, process 600 may include sending the data to the additional device via the at least one first link (block 670). For example, the device (e.g., using processor 310, memory 315, storage component 320, input component 325, output component 330, communication interface 335, input component 355, switching component 360, output component 365, controller 370, and/or the like) may send the data to the additional device via the at least one first link, as described above.

Process 600 may include additional implementations, such as any single implementation or any combination of implementations described below and/or in connection with one or more other processes described elsewhere herein.

In a first implementation, determining that a MACsec session is not established on any first link of the plurality of first links comprises determining, for each first link of the plurality of first links, that a MACsec authentication process associated with the first link was not successful.

In a second implementation, alone or in combination with the first implementation, disabling the second link comprises causing power to cease being provided to the second link.

In a third implementation, alone or in combination with one or more of the first and second implementations, disabling the second link comprises causing power to be provided to the second link.

In a fourth implementation, alone or in combination with one or more of the first through third implementations, sending the data to the additional device via the at least one first link comprises causing the data to be formatted for transmission via a MACsec session and sending the formatted data to the additional device via the at least one first link.

In a fifth implementation, alone or in combination with one or more of the first through fourth implementations, the device may receive, after enabling the second link, additional data from the additional device via the at least one first link and may send the additional data to the server device via the second link.

In a sixth implementation, alone or in combination with one or more of the first through fifth implementations, the device may determine, after enabling the second link, that a MACsec session is established on at least one additional first link of the plurality of first links, may receive additional data from the server device via the second link, and may send the additional data to the additional device via the at least one first link or the at least one additional first link.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

As used herein, the term traffic or content may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   determining, by a device, that a first link of the device is active;
   determining, by the device, whether a Media Access Control Security (MACsec) session is established on the first link;
   disabling, by the device, a second link of the device based on determining that the MACsec session is not established on the first link;
   determining, by the device and after disabling the second link, that the MACsec session is established on the first link;
   enabling, by the device, the second link based on determining that the MACsec session is established on the first link; and
   sending, by the device, data to a different device via the first link.

2. The method of claim 1, wherein the first link connects the device and a routing device.

3. The method of claim 1, wherein the second link connects the device and a server device.

4. The method of claim 1, further comprising:
   receiving, after enabling the second link, the data from a server device via the second link; and
   wherein sending the data to a different device via the first link comprises:
      sending the data based on receiving the data.

5. The method of claim 1, wherein determining whether the MACsec session is established on the first link comprises:
   determining whether an authentication process associated with the MACsec session was unsuccessful.

6. The method of claim 1, wherein determining that the first link is active comprises:
   determining that a physical layer of the first link has an active status.

7. The method of claim 1, wherein disabling the second link comprises:
   causing a physical layer of the second link to be deactivated.

8. A device, comprising:
   one or more memories; and
   one or more processors, communicatively coupled to the one or more memories, to:
      determine that a first link between the device and an additional device is active;
      determine that a Media Access Control Security (MACsec) session is established on the first link based on determining that an authentication process associated with the MACsec session was successful;
      enable a second link between the device and a server device based on determining that the MACsec session is established,
         wherein the one or more processors, when enabling the second link, are to:
            cause a physical layer or a data link layer of the second link to be activated;
      receive, after enabling the second link, data from the server device via the second link; and
      send the data to the additional device via the first link.

9. The device of claim 8, wherein the one or more processors, when determining that the MACsec session is established on the first link, are to:
   determine that the device and the additional device successfully exchanged and verified security keys.

10. The device of claim 8, wherein the one or more processors, when determining that the first link is active, are to:
    determine that a physical layer of the first link and a data link layer of the first link have an active status.

11. The device of claim 8, wherein the one or more processors, when sending the data to the additional device via the first link, are to:
    cause the data to be encrypted using an encryption algorithm associated with the MACsec session; and
    send, after causing the data to be encrypted, the data to the additional device via the first link.

12. A non-transitory computer-readable medium storing instructions, the instructions comprising:
    one or more instructions that, when executed by one or more processors of a device, cause the one or more processors to:
       determine that a plurality of first links between the device and an additional device are active;
       determine that a Media Access Control Security (MACsec) session is not established on any first link of the plurality of first links;
       disable a second link between the device and a server device based on determining that a MACsec session is not established on any first link of the plurality of first links;
       determine, after disabling the second link, that a MACsec session is established on at least one first link of the plurality of first links;
       enable the second link based on determining that the MACsec session is established on the at least one first link;
       receive, after enabling the second link, data from the server device via the second link; and
       send the data to the additional device via the at least one first link.

13. The non-transitory computer-readable medium of claim 12, wherein the one or more instructions, that cause the one or more processors to determine that the MACsec session is not established on any first link of the plurality of first links, cause the one or more processors to:
    determine, for each first link of the plurality of first links, that a MACsec authentication process associated with the first link was not successful.

14. The non-transitory computer-readable medium of claim 12, wherein the one or more instructions, that cause the one or more processors to disable the second link, cause the one or more processors to:
    cause power to cease being provided to the second link.

15. The non-transitory computer-readable medium of claim 12, wherein the one or more instructions, that cause the one or more processors to enable the second link, cause the one or more processors to:
    cause power to be provided to the second link.

16. The non-transitory computer-readable medium of claim 12, wherein the one or more instructions, that cause the one or more processors to send the data to the additional device via the at least one first link, cause the one or more processors to:
    cause the data to be formatted for transmission via a MACsec session; and
    send the formatted data to the additional device via the at least one first link.

17. The non-transitory computer-readable medium of claim 12, wherein the one or more instructions, when executed by the one or more processors, further cause the one or more processors to:

receive, after enabling the second link, additional data from the additional device via the at least one first link; and send the additional data to the server device via the second link.

18. The non-transitory computer-readable medium of claim 12, wherein the one or more instructions, when executed by the one or more processors, further cause the one or more processors to:

determine, after enabling the second link, that a MACsec session is established on at least one additional first link of the plurality of first links;

receive additional data from the server device via the second link; and send the additional data to the additional device via the at least one first link or the at least one additional first link.

19. The method of claim 1, wherein disabling the second link comprises:

changing a status of a physical layer or a datalink layer of the second link to an inactive status.

20. The device of claim 8, wherein the one or more processors, when enabling the second link between the device and the server device, are to:

cause power to be provided to the second link.

* * * * *